United States Patent
Kobayashi et al.

(10) Patent No.: US 6,819,643 B2
(45) Date of Patent: Nov. 16, 2004

(54) OPTICAL DISK APPARATUS, METHOD OF RECORDING ON OPTICAL DISK, AND OPTICAL DISK

(75) Inventors: Seiji Kobayashi, Kanagawa (JP); Toshihiro Horigome, Kanagawa (JP)

(73) Assignee: Sony Corporation, Tokyo (JP)

( * ) Notice: Subject to any disclaimer, the term of this patent is extended or adjusted under 35 U.S.C. 154(b) by 647 days.

(21) Appl. No.: 09/850,103

(22) Filed: May 8, 2001

(65) Prior Publication Data

US 2002/0006093 A1 Jan. 17, 2002

(30) Foreign Application Priority Data

May 11, 2000 (JP) ........................................ 2000-143409

(51) Int. Cl.[7] .............................................. G11B 7/00
(52) U.S. Cl. .................. 369/53.21; 369/59.13
(58) Field of Search .................... 369/47.12, 47.19, 369/47.21, 47.25, 53.2, 53.21, 59.13, 59.21, 59.23, 59.24, 59.25

(56) References Cited

U.S. PATENT DOCUMENTS

| 5,761,301 | A | * | 6/1998 | Oshima et al. ............... 705/57 |
| 6,011,765 | A | * | 1/2000 | Nishio ..................... 369/47.12 |
| 6,061,319 | A | * | 5/2000 | Fujiki ...................... 369/59.21 |
| 6,072,759 | A | * | 6/2000 | Maeda et al. ............ 369/59.25 |
| 6,108,296 | A | * | 8/2000 | Kajiyama et al. ........ 369/275.4 |
| 6,219,322 | B1 | * | 4/2001 | Kobayashi ............... 369/59.11 |
| 6,665,240 | B1 | * | 12/2003 | Kobayashi et al. ...... 369/47.15 |

* cited by examiner

*Primary Examiner*—Thang V. Tran
*Assistant Examiner*—Bach Q Vuong
(74) *Attorney, Agent, or Firm*—Oblon, Spivak, McClelland, Maier & Neustadt, P.C.

(57) ABSTRACT

In an optical disk apparatus, bit sequences of information regarding copyright are respectively scrambled using different binary sequences, thereby generating plural lines of signals. The plural lines of signals are further scrambled to generate a single line of drive signal, with which laser beam is modulated.

19 Claims, 7 Drawing Sheets

OPTICAL DISK APPARATUS, METHOD OF RECORDING ON OPTICAL DISK, AND OPTICAL DISK

BACKGROUND OF THE INVENTION

1. Field of the Invention

The present invention relates to an optical disk apparatus, a method of recording on an optical disk, and an optical disk, and may be applied, for example, to a minidisk (MD), a compact disk (CD), a digital video disk (DVD), etc., and recording and playback apparatuses therefor. More specifically, according to the present invention, bit sequences of information regarding copyright are respectively scrambled using different binary sequences to generate plural lines of signals, and the plural lines of signals are further scrambled to generate a single line of drive signal, with which laser beam is modulated, so that the benefits of the copyright holder are protected more effectively compared with before.

2. Description of the Related Art

Minidisk apparatuses, which are a type of optical disk apparatuses, have been rapidly spreading in recent years because they readily allow copying of various contents of music while not degrading the quality of sound. More specifically, the minidisk apparatuses allow music information distributed via the Internet to be recorded on minidisks for audition, and also allow music on a compact disk borrowed from a friend, etc. to be recorded on a minidisk for audition. Furthermore, music can also be copied from minidisk to minidisk.

Although the easy copying of music, with the sound quality maintained, provides considerable advantages to the user, the benefits of the copyright holder who has created the music may be impoverished. Thus, in organizations and forums such as RIAA (Recording Industry Association of America), SDMI (Secure Digital Music Initiative), CPTWG (Copy Protection Technical Working Group), various approaches have been considered aiming at protection of the benefits of the copyright holder.

As one of the approaches, a method has been proposed in which music information is recorded while being encrypted using copyright protection information which is unique to each storage medium. According to this method, if the music information is copied to another storage medium, decryption is inhibited because the copyright protection information differs from storage medium to storage medium. Accordingly, unrestricted copying of the music information is prevented, thereby protecting the benefits of the copyright holder.

As methods of recording the copyright protection information, for example, a method in which a sector inhibited from user access is provided and the copyright protection information is recorded in the sector, and a method in which a reflection film is partially removed from recording of primary data in the form of a pit sequence so that the copyright protection information is recorded in the form of bar codes (International Publication No. WO97/14144), have been proposed.

These methods, however, are not still practically sufficient to effectively protect the benefits of the copyright holder.

More specifically, in accordance with the method in which the copyright protection information is recorded in the sector inhibited from user access, while the copyright protection information can be recorded relatively easily, the copyright protection information is rather susceptible to copying.

In accordance with the method in which the copyright protection information is recorded in the form of bar codes by partially removing the reflection film, recording of the copyright protection information can be visually checked by observations using a microscope, etc., for the purpose of copying. Thus, so-called pirated editions cannot be fully prevented. Instead of removing the reflection film, in another method, an opaque film may be partially formed on the surface of an optical disk, the copyright protection information being recorded in a similar manner. However, this method also suffers the similar problem as in the method in which the reflection film is partially removed.

SUMMARY OF THE INVENTION

The present invention has been made in view of the above, and an object thereof is to provide an optical disk apparatus, a method of recording on an optical disk, and an optical disk which serve to protect the benefits of the copyright holder more effectively compared with before.

To this end, the present invention, in one aspect thereof, provides an optical disk apparatus which records information regarding copyright on a disk-shaped storage medium by emission of laser beam. The optical disk apparatus includes a plurality of binary sequence generating units for generating binary sequences corresponding to the number of bits of the information regarding copyright, at a transmission rate which is faster than that of the information regarding copyright; a plurality of operation units for operating the binary sequences with corresponding bits of the information regarding copyright and outputting a plurality of operation results; a selection unit for outputting a drive signal by selectively outputting, according to a predetermined switching signal, the plurality of operation results; and a modulation unit for modulating the laser beam in accordance with said drive signal.

Thus, the bits of the information regarding copyright are scrambled with one another, and also scrambled using the binary sequences. Accordingly, the information regarding copyright is inhibited from detection; thus, the benefits of the copyright holder can be protected more effectively compared with before.

The present invention, in another aspect thereof, provides a method of recording on an optical disk, in which information regarding copyright is recorded on a disk-shaped storage medium by emission of laser beam. The method includes the steps of generating plural lines of signals by respectively scrambling bit sequences of the information regarding copyright with different binary sequences having a transmission rate which is faster than that of the information regarding copyright; scrambling the plural lines of signals to generate a single line of drive signal; and modulating the laser beam in accordance with the single line of drive signal.

Thus, the bits of the information regarding copyright are scrambled with one another, and also scrambled using the binary sequences. Accordingly, the information regarding copyright is inhibited from detection; thus, the benefits of the copyright holder can be protected more effectively compared with before.

The present invention, in another aspect thereof, provides an optical disk on which information regarding copyright is recorded. In the optical disk, each bit of the information regarding copyright is recorded while being distributed in the circumferential direction of an information recording surface of the optical disk.

Accordingly, the information regarding copyright is inhibited from detection; thus, the benefits of the copyright holder can be protected more effectively compared with before.

The present invention, in another aspect thereof, provides an optical disk apparatus, in which encryption processing is performed using information regarding copyright which is recorded on an optical disk. The optical disk apparatus includes a playback signal generating unit for emitting laser beam on the optical disk, receiving returning light, and generating a playback signal in accordance with the returning light; a binary sequence generating unit for generating a plurality of binary sequences with reference to a synchronization pattern of the playback signal; a plurality of sampling units for sampling the playback signal with reference respectively to the binary sequences to thereby output a plurality of sampling results; a plurality of integration units for respectively integrating the plurality of sampling results to thereby output a plurality of integration results; and a determination unit for respectively determining the integration results and decoding corresponding bit sequences of the information regarding copyright.

Accordingly, even if the bits of the copyright protection information is scrambled with one another and also scrambled using the binary sequences so as to inhibit detection, the information regarding copyright can be accurately played back.

In accordance with the present invention, bit sequences of information regarding copyright are respectively scrambled using different binary sequences to generate plural lines of signals, and the plural lines of signals are further scrambled to generate a single line of drive signal, with which laser beam is modulated. Accordingly, the benefits of the copyright holder can be protected more effectively compared with before.

DESCRIPTION OF THE PREFERRED EMBODIMENTS

Figure 2:
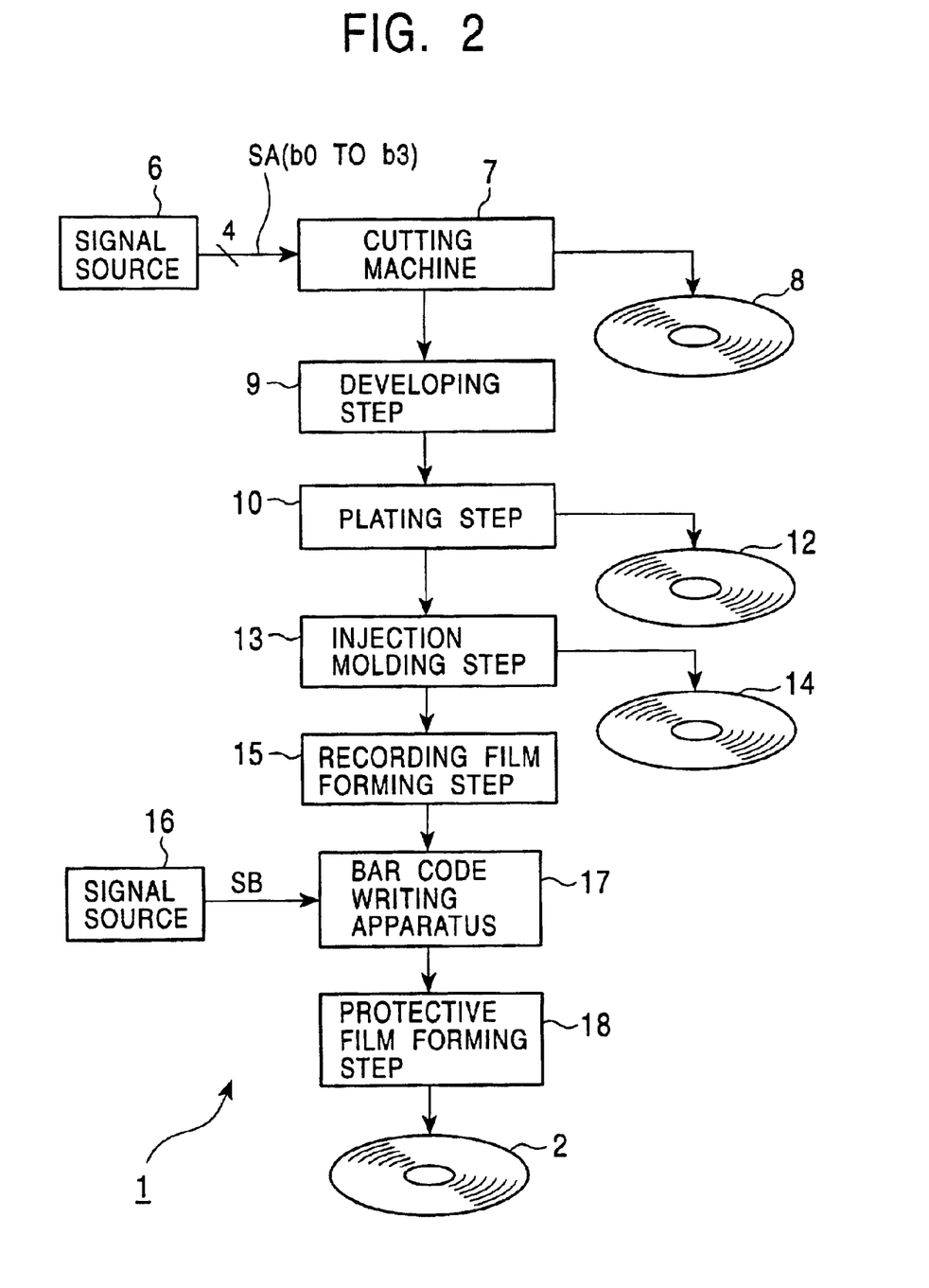
FIG. 2 is a process chart of the manufacturing process of a minidisk according to the embodiment.

An embodiment of the present invention will be described below with reference to the accompanying drawings as required.
(1) Construction of the Embodiment FIG. 2 is a process chart showing a manufacturing process of an optical disk according to the embodiment of the present invention. In this embodiment, two types of copyright protection information SA and SB are recorded on a minidisk 2 in the optical disk manufacturing process 1.

The two types of copyright protection information SA and SB are used in combination to encrypt audio data, etc. recorded on the minidisk 2 and to decrypt the audio data, etc. recorded on the minidisk 2. The copyright protection information SA and SB correspondingly include, for example, ID information unique to each minidisk, information relating to manufacturing factories, year and date of production, information for controlling enabling/disabling of copying, etc.

Figure 3:
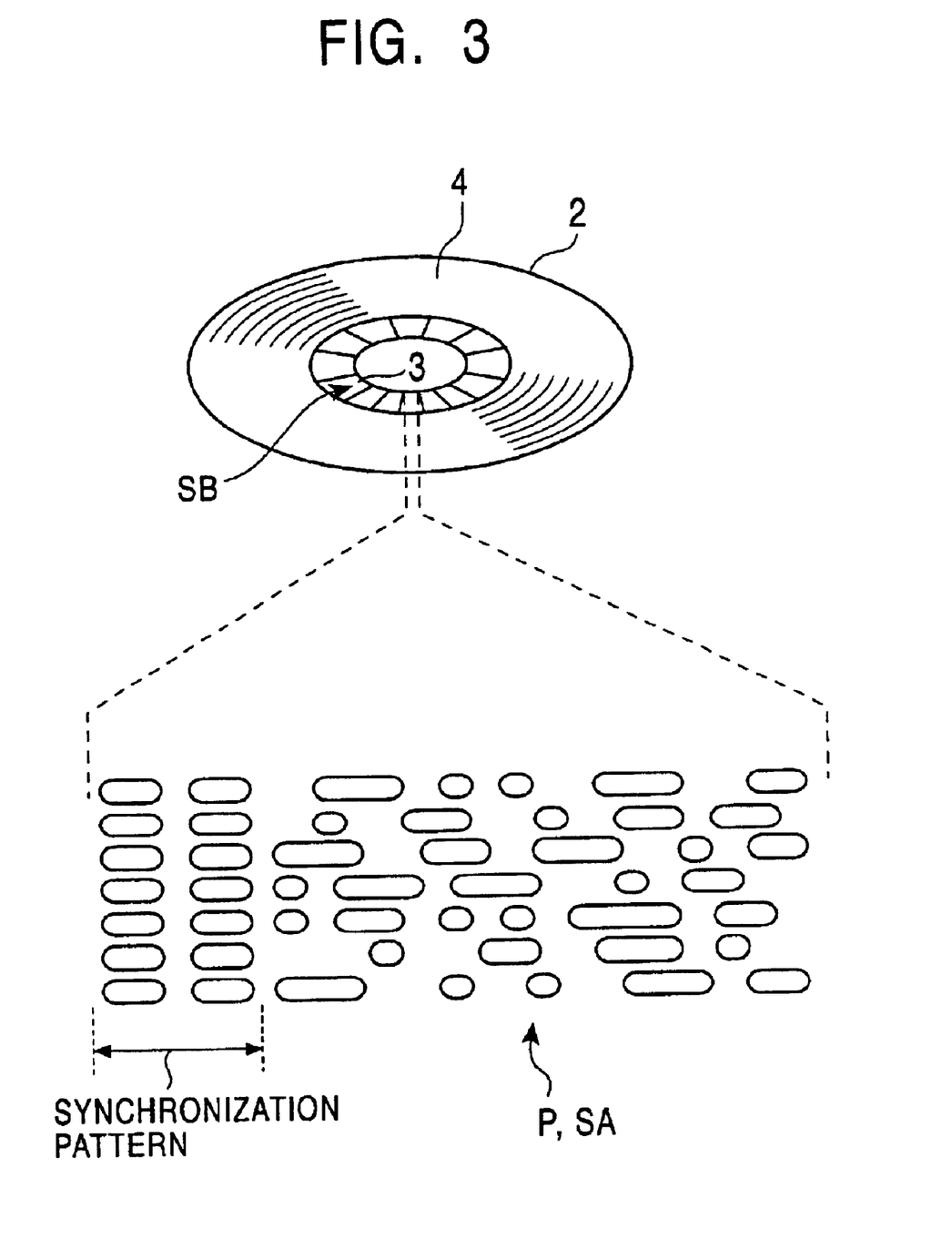
FIG. 3 is a schematic diagram showing the minidisk manufactured according to the manufacturing process shown in FIG. 2.

As shown in FIG. 3, in the minidisk 2, the information recording surface is concentrically divided, the inner region being allocated as a copyright information recording region 3, and the outer region being allocated as a user data recording region 4. The minidisk 2 is implemented so that the two types of copyright protection information SA and SB are recorded in the copyright information recording region 3, while the audio data, etc. are recorded in the user data recording region 4. More specifically, in the copyright information recording region 3 of the minidisk 2, the copyright protection information SA is repeatedly recorded in the form of a pit sequence, and overlapping the recording of the copyright protection information SA, the copyright protection information SB is recorded in the form of bar codes corresponding to variations in the properties of a recording film. In the user data recording region 4 of the minidisk 2, similarly to an ordinary minidisk, a groove for guiding laser beam is formed so as to meander in accordance with address information, and a lead-in area, etc. are also formed.

In the optical disk manufacturing process 1, a signal source 6 repeatedly supplies to a cutting machine 7 the copyright protection information SA in four parallel bits.

The cutting machine 7 modulates recording laser beam primarily in accordance with the copyright protection information SA, and irradiates a disk body 8 with the modulated recording laser beam. The cutting machine 7 also modulates the recording laser beam in accordance with predetermined address information, and irradiate the disk body 8 with the modulated recording laser beam. The cutting machine 7 thus exposes the disk body 8, recording the copyright protection information SA, the groove, the lead-in area, etc.

In a subsequent developing step 9 of the optical disk manufacturing process 1, the disk body 8 which has thus been exposed by the cutting machine 7 undergoes developing, so that fine concavities and convexities of the pit sequence and the groove are formed corresponding to the exposure.

In a subsequent plating step 10, the disk body 8 is plated, whereby a mother disk 12 is created. In the optical disk manufacturing process 1, a stamper is created from the mother disk 12, and in an injection molding step 13, the stamper is placed on an injection molding machine to perform injection molding, so that disk substrates 14 are mass-produced by having the fine concavities and convexities of the mother disk 12 transferred thereto.

In a subsequent recording film forming step 15, a magneto-optical recording film is formed on the disk substrate 14, for example, by sputtering.

A signal source 16 outputs the copyright protection information SB to a bar code writing apparatus 17. The bar code writing apparatus 17 records the copyright protection information SB in the form of bar codes by altering the properties of the recording film on the disk substrate 14 in accordance with the copyright protection information SB. More specifically, the bar code writing apparatus 17 drives and rotates the minidisk 2 mounted thereon, on which the recording film is formed, while modulating laser beam, which is produced by a high-power laser, for example, a YAG (yttrium-aluminum-garnet) laser, in accordance with the copyright protection information SB. Thus, the region where the copyright protection information SA has been recorded is irradiated by the modulated laser beam in synchronization with the rotation of the minidisk 2, thereby partially changing the reflectivity of the recording film. Accordingly, the copyright protection information SB is recorded in the form of bar codes. In recording the copyright protection information SB in the form of bar codes by changing the properties of the recording film, for example, a carbon dioxide gas laser or a high-power semiconductor laser may be used as an alternative to the YAG laser.

In a subsequent protective film forming step 18 of the optical disk manufacturing process 1, a protective film is formed over the recording film, whereby the minidisk 2 is fully manufactured.

Figure 4:
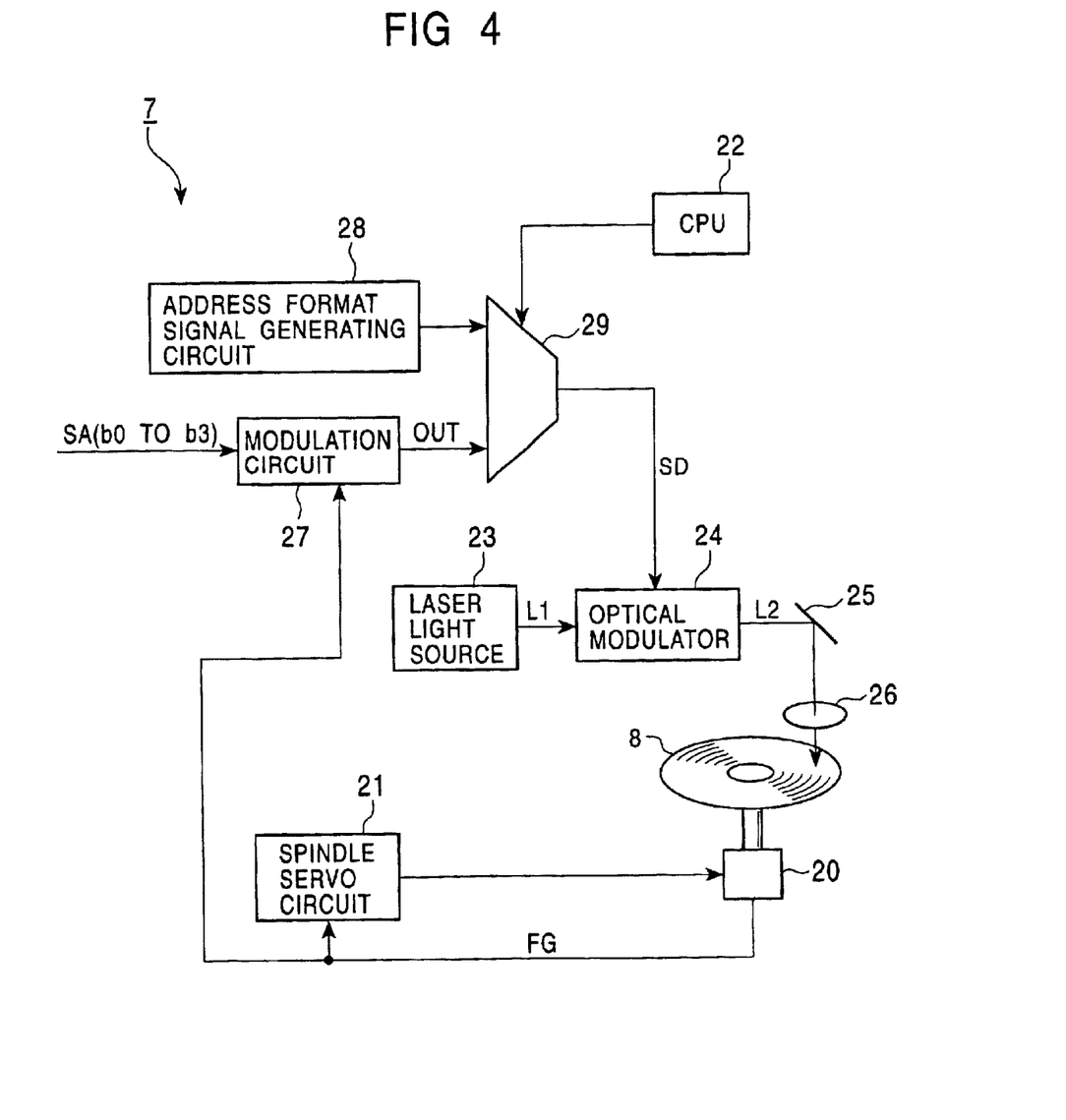
FIG. 4 is a block diagram of the cutting machine which is used in the manufacturing process shown in FIG. 2.

FIG. 4 is a block diagram of the cutting machine 7. The cutting machine 7 records the copyright protection information SA on the disk body 8 in the form of a pit sequence, and also records the groove, the lead-in area, etc. on the disk body 8.

More specifically, in the cutting machine 7, a spindle motor 20, under the control of a spindle servo circuit 21, drives and rotates the disk body 8 at a predetermined rotation rate, and an FG signal generator which is held at the bottom of the spindle motor 20 outputs an FG signal FG whose signal level rises each time the disk body 8 rotates by a predetermined angle. The spindle servo circuit 21 controls the operation of the spindle motor 20 so that the disk body 8 rotates at the predetermined rotation rate with reference to the FG signal FG.

A laser light source 23, which is implemented, for example, by a gas laser, emits recording laser beam L1 towards an optical modulator 24.

The optical modulator 24, which is implemented, for example, by an acousto-optic modulator, modulates the recording laser beam L1 in accordance with a drive signal SD, and irradiates modulated laser beam L2. The operation of the optical modulator 24 is switched under the control of a central processing unit 22. More specifically, the laser beam L1 is turned on and off in accordance with the drive signal SD while the copyright protection information SA and information required to form the lead-in area, etc. are being recorded, whereas the laser beam L1 is modulated by changing the direction of irradiation in accordance with the drive signal SD while the groove is being recorded.

A mirror 25 directs the light path of the laser beam L2 towards the disk body 8. An objective lens 26 condenses the light reflected by the mirror 25 on the recording surface of the disk body 8. The mirror 25 and the objective lens 26 are allowed, by a sled mechanism (not shown), to gradually move in the radial direction of the disk body 8 in synchronization with the rotation of the disk body 8. The cutting machine 7 thus gradually moves the focused spot of the laser beam L2 toward the outer circumference of the disk body 8, thereby forming a spiral track on the disk body 8. Furthermore, in the copyright information recording region 3, a pit sequence in accordance with the drive signal SD is formed on the track so that the copyright protection information SA is recorded, and in a similar manner, the lead-in area, etc. are recorded. In the user data recording region 4, the address information is recorded in the form of a groove meandering in accordance with the drive signal SD.

A modulation circuit 27 receives the copyright protection information SA (b0 to b3) from the signal source 6, and modulates the copyright protection information SA to output a modulated signal OUT.

An address format signal generating circuit 28 generates address information, format information, etc. required in the lead-in area and the user data recording region 4, and in accordance therewith, generates, for example, a wobble signal whose signal level changes in accordance with the meandering of the groove.

A data selector 29, under the control of the central processing unit 22, selects either the modulated signal OUT output from the modulation circuit 27 or the output signal from the address format signal generating circuit 28, and outputs it as the drive signal SD. The central processing unit 22 constitutes a control circuit for controlling the operation of the cutting machine 7. More specifically, the central processing unit 22 detects the irradiation point of the laser beam L2 by monitoring the sled mechanism driving the mirror 25 and the objective lens 26, and in accordance with the detection results, controls switching of the operations of the data selector 29, the optical modulator 24, etc.

Figure 1:
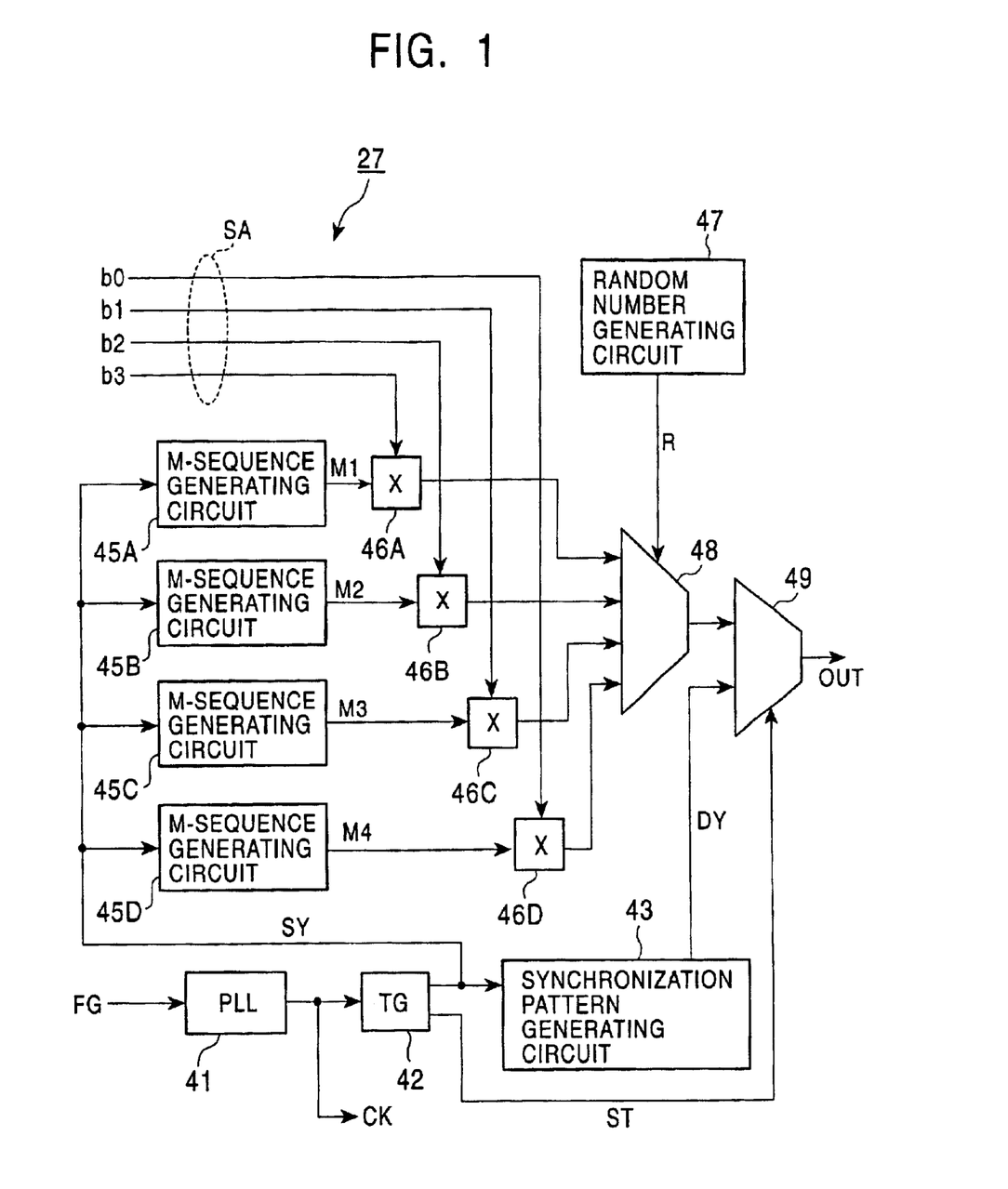
FIG. 1 is a block diagram of a modulation circuit in a cutting machine which is used in an embodiment of the present invention.
Figure 5:
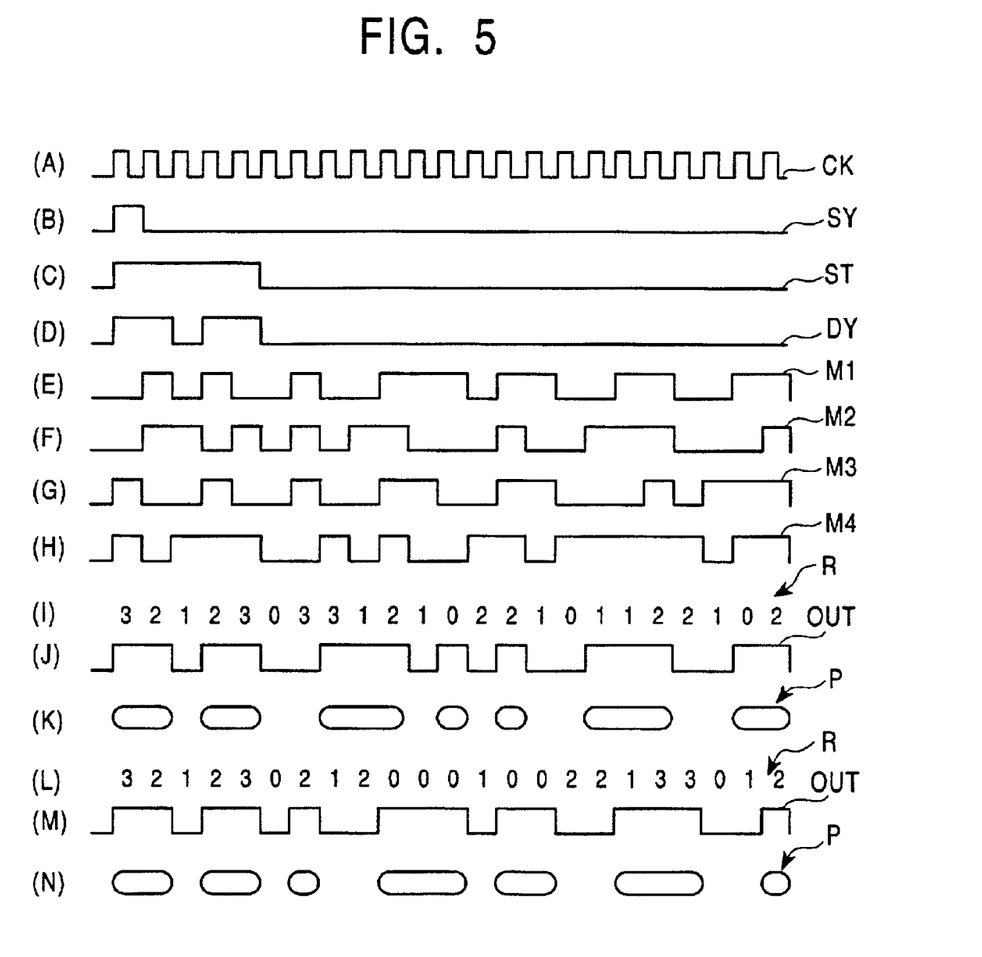
FIG. 5 is a waveform chart which serves in an explanation of the modulation circuit shown in FIG. 1.

FIG. 1 is a block diagram of the modulation circuit 27, and FIG. 5 is a signal waveform chart showing the operation of the modulation circuit 27. The modulation circuit 27 processes the copyright protection information SA with reference to the FG signal FG to thereby modulate the copyright protection information SA, generating the modulated signal OUT. In the modulation circuit 27, a PLL circuit 41 operates with reference to the FG signal FG, generating a channel clock CK, indicated by (A) in FIG. 5, in synchronization with the rotation of the disk body 8, which will be supplied to each part of the modulation circuit 27.

A timing generator (TG) 42 counts pulses of the channel clock CK, and thereby generates at a predetermined time interval an initialization pulse SY for initializing M-sequence generating circuits 45A to 45D. The timing generator 42 also generates a synchronization pattern select signal ST in synchronization with the initialization pulse SY. In this embodiment, the initialization pulse is high for a width of one clock in synchronization with the channel clock CK, as indicated by (B) in FIG. 5. The synchronization pattern select signal ST is high for a width of five clocks from the rising edge of the initialization pulse SY, as indicated by (C) in FIG. 5.

In the modulation circuit 27, the copyright protection information SA is received at a bit rate much slower than the channel clock CK.

A synchronization pattern generating circuit 43 generates a predetermined synchronization pattern DY with reference to the rising edge of the initialization pulse SY. In this embodiment, the synchronization pattern DY is such that the logic value thereof is "11011" in a period of five clocks from the rising edge of the initialization pulse SY, as indicated by (D) in FIG. 5.

The M-sequence generating circuits 45A to 45D are initialized in response to the initialization pulse SY, and output M-sequences M1 to M4 whose logic levels change in synchronization with the channel clock CK, as indicated by (E) to (H) in FIG. 5. In the M-sequences M1 to M4, the logic values change at random with logic 1 and logic 0 appearing with the same probability. In this embodiment, the M-sequences M1 to M4 exhibit changes independently of each other, i.e., there is no correlation, except for changing in synchronization with the channel clock CK.

Accordingly, the M-sequence generating circuits 45A to 45D constitute a plurality of binary sequence generating means which generate binary sequences corresponding to the number of bits of the copyright protection information SA, at a transmission rate which is faster than that of the copyright protection information SA, and repeatedly outputs the binary sequences with reference to the synchronization pattern.

Operation circuits (X) 46A to 46D, which are implemented by exclusive OR circuits, exclusively-ORes the M-sequence signals M1 to M4 with the bits b0 to b3 of the copyright protection information SA, respectively, and outputs the operation results. The modulation circuit 27 thus scrambles each bit of the copyright protection information SA using the M-sequence signals M1 to M4. Because the M-sequence signals M1 to M4 have no correlation, even if the logic values of the bits b0 to b3 are the same, the operation results may differ, and at the time of decoding, each of the bits b0 to b3 are processed using the M-sequence signals M1 to M4, respectively, independently of each other. Accordingly, the operation circuits 46A to 46D constitute a plurality of operation means which operate the binary sequences from the M-sequence generating circuits 45A to 45D with corresponding bits of the copyright protection information SA, and which output a plurality of operation results. In this embodiment, the operation circuits 46A to 46D repeatedly operate the same copyright protection information with the binary sequences and output the operation results.

A random number generating circuit 47 generates, in synchronization with the channel clock CK, a two-bit random number R which takes any one of the values 0, 1, 2, and 3, as indicated by (I) in FIG. 5, and outputs the random number R to a data selector 48. The data selector 48 selectively outputs the operation results of the operation circuits 46A to 46D according to the value of the random number R. More specifically, the output of the first operation circuit 46A will be selected if the output of the random number generating circuit 47 is a 0, and the output of the operation circuits 46B, 46C, and 46D will be selected if the output of the random number generating circuit 47 is a 1, 2, and 3, respectively.

Thus, the modulation circuit 27 integrates the operation results from the operation circuits 46A to 46D, which will be independently decoded based on the corresponding M-sequences M1 to M4, into a single line for the purpose of further scrambling. Accordingly, the data selector 48 constitutes selecting means which outputs the drive signal SD by selectively outputting the plurality of operation results according to the switching signal of the random number.

A data selector 49 selectively outputs either the synchronization pattern DY output from the synchronization pattern generating circuit 43 or the output from the data selector 48 based on the synchronization pattern select signal ST. Thus, the modulation circuit 27 first outputs the synchronization pattern DY of logic "11011" in a period of five clocks from the rising edge of the initialization pulse SY, and then outputs the output from the data selector 48, as indicated by (J) in FIG. 5.

Thus, a pit sequence P corresponding to the output signal OUT from the modulation circuit 27 is formed in the copyright information recording region 3 of the disk body 8, as indicated by (K) in FIG. 5. Referring to FIG. 5, (L) to (N) show the output signal OUT and formation of the pit sequence P in another period with reference to the initialization pulse SY. In this embodiment, because the operation results of the four lines are integrated, using the random number R, into a single line for the purpose of scrambling, as indicated by (L) to (N) in FIG. 5, the pit sequences recorded on the disk body 8 exhibit variations even if the logic values of the copyright protection information SA are the same. Accordingly, in this embodiment, detection and analysis of the copyright protection information SA are inhibited.

The modulation circuit 27 selects the generation cycle of the synchronization pattern select signal ST and the number of bytes of the copyright protection information SA so that pits corresponding to the synchronization pattern is precisely arranged in equivalent positions of multiple tracks of the minidisk 2, as shown in (B) of FIG. 3. More specifically, as viewed from the rotational center of the minidisk 2, the information recording surface of the minidisk 2 is divided at a predetermined angular interval, and the synchronization pattern is recorded in predetermined regions from the beginning of the divided areas. Accordingly, by the recording of the copyright protection information SB in the form of bar codes, the minidisk 2 is inhibited from accurate tracking control in the copyright information recording region 3.

Thus, in the minidisk 2, each bit of the information regarding copyright is recorded while being distributed in the circumferential direction of the information recording surface.

Figure 6:
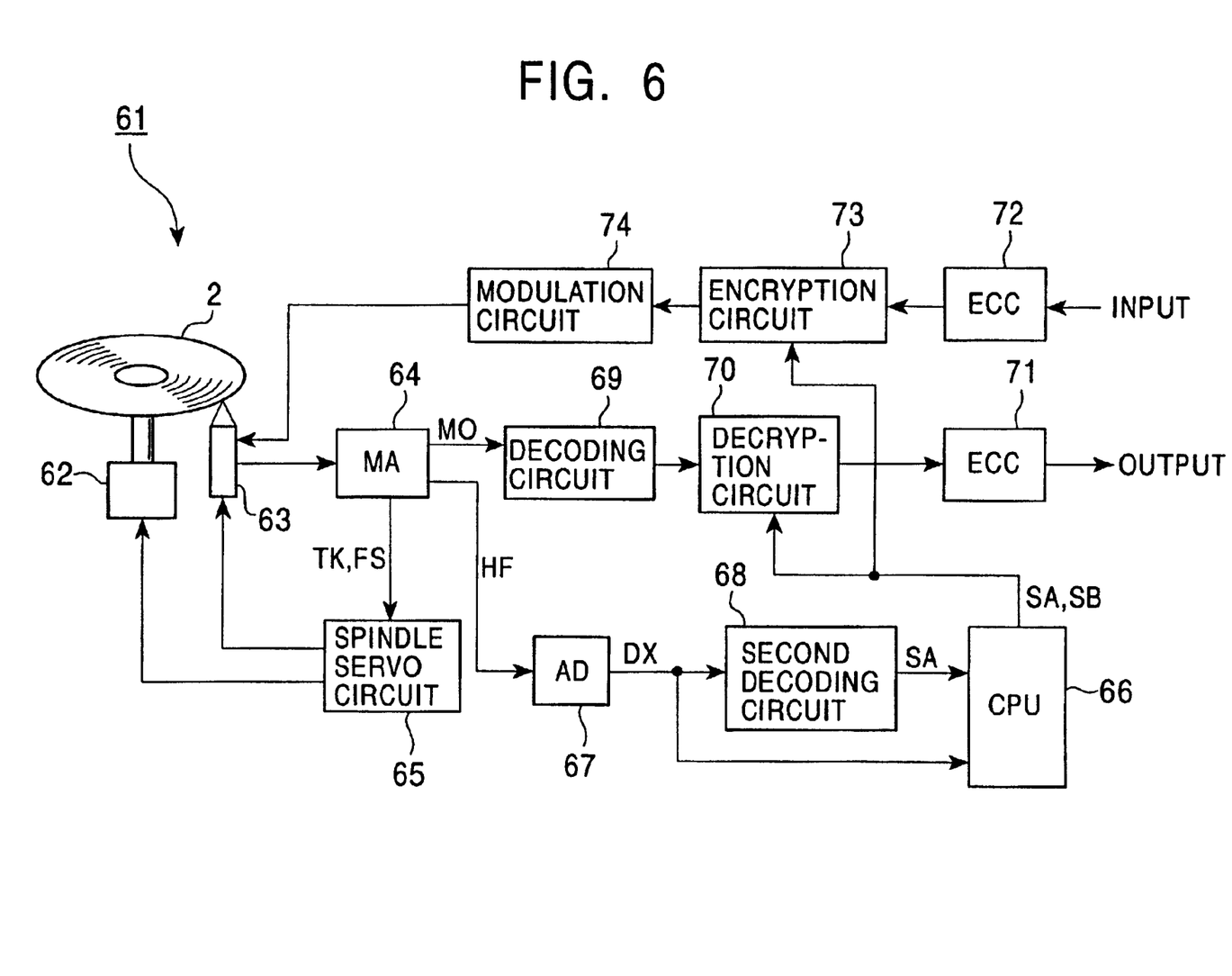
FIG. 6 is a block diagram of an optical disk apparatus for recording on and playback from the minidisk shown in FIG. 3.

FIG. 6 is a block diagram of an optical disk apparatus for recording on and playback from the minidisk 2 which has thus been manufactured. In the optical disk apparatus 61, a spindle motor 62, under the control of a spindle servo circuit 65, drives and rotates the minidisk 2 at a predetermined rotation rate.

An optical pickup 63 is held by a predetermined sled mechanism so as to be movable in the radial direction of the minidisk 2. The optical pickup 63 irradiates the minidisk 2 with laser beam, receives the returning light, and outputs a signal corresponding to the received light. In recording, the optical pickup 63 applies a modulated magnetic field by intermittently raising, in accordance with the amount of light at the time of playback, the amount of light of the laser beam at the amount of light at the time of playback, thereby thermomagnetically recording various information by the so-called pulse train method.

A matrix amp (MA) 64 processes the output signal from the optical pickup 63 to thereby generate and output a wobble signal whose signal level changes according to the meandering of the groove, a tracking error signal TK whose signal level changes according to the amount of tracking error, a focus error signal FS whose signal level changes according to the amount of focus error, a playback signal MO whose signal level changes according to the polarization plane of the light returning from the minidisk 2, using the magnetic Kerr effect, and a playback signal HF whose signal level changes according to the variations in the recording film and the pit sequence on the minidisk 2.

The servo circuit 65, in accordance with the tracking error signal TK and the focus error signal FS, performs tracking control and focus control of the optical pickup 63. The servo circuit 65 also controls the rotation rate of the spindle motor 62 so that the clock generated by the wobble signal will be of a predetermined frequency. Furthermore, the address information is obtained from the wobble signal, and by the control of a central processing unit (CPU) 66, the optical pickup 63 is made to seek predetermined positions.

An analog-digital converting circuit (AD) 67 sequentially converts the playback signal HF from analog to digital at a cycle sufficiently shorter compared with the channel clock CK described earlier, thereby outputting an eight-bit digital playback signal DX. A second decoding circuit 68 decodes the copyright protection information SA by processing the digital playback signal DX obtained from the copyright information recording region 3.

The central processing unit 66 constitutes a control circuit for controlling the operation of the optical disk apparatus 61. When a minidisk detecting mechanism (not shown) detects that the minidisk 2 is loaded, similarly as in an ordinary minidisk apparatus, the central processing unit 66 makes the optical pickup 63 seek the lead-in area under the control of the servo circuit 65, thereby obtaining TOC data, etc. which are required in order to access the minidisk 2. Subsequently, the central processing unit 66 makes the optical pickup 63 seek the copyright information recording region 3, so that the copyright protection information SA is obtained from the second decoding unit 68. At this time, in the copyright information recording region 3, the copyright protection information SB is recorded in the form of bar codes, inhibiting tracking control; thus, the central processing unit 66 stops the operation of tracking control, and instructs the servo circuit 65 for an access with focus control only.

When the copyright protection information SA is obtained from the second decoding circuit 68 in this manner, the central processing unit 66 also plays back the copyright protection information SB by processing the digital playback signal DX. More specifically, the central processing unit 66 determines the binary levels of the digital playback signal DX using a predetermined threshold value, and in accordance with the binarization results, plays back the clock which served in the recording of the copyright protection information SB. Furthermore, the central processing unit 66, with reference to the clock, sequentially latches the binarization results and generates playback data. The central processing unit 66, by performing error correction processing, etc. on the playback data as required corresponding to processing at the time of recording, plays back the copyright protection information SB recorded in the form of bar codes.

Accordingly, the central processing unit 66 drives the playback system by generating information which is required for decryption from the two sets of copyright protection information SA and SB when the user instructs playback of the minidisk 2, while driving the recording system by generating in a similar manner information which is required for encryption when recording on the minidisk 2 is instructed.

In the playback system which operates under the control of the central processing unit 66 as described above, similarly to a decoding circuit in an ordinary minidisk apparatus, a decoding circuit 69 processes the playback signal MO to play back the clock, and furthermore, with reference to the clock, demodulates the playback signal MO, using EFM (Eight to Fourteen Modulation) techniques, thereby outputting the playback data.

A decryption circuit 70 decrypts the playback data, using the copyright protection information SA and SB. An error correction coding circuit (ECC) 71 corrects errors in the output data from the decryption circuit 70. The errors are generated, for example, due to defects, etc. on the minidisk 2. Accordingly, the optical disk apparatus 61 plays back and outputs the audio data, etc. which have been recorded using an encryption processing, which is unique to the minidisk 2, using the copyright protection information SA and SB.

Whereas in the recording system, the error correction coding circuit (ECC) 72 adds error correcting codes to input data which is sequentially input. A subsequent encryption circuit 73 encrypts the output data from the error correction circuit 72 using the copyright protection information SA and SB. A modulation circuit 74 modulates the output data from the encryption circuit 73 using EFM (Eight to Fourteen Modulation) techniques, thereby generating a modulated signal, and drives a modulation coil in the optical pickup 63 in accordance with the modulated signal. Accordingly, the optical disk apparatus 61 records the audio data, etc. encrypted using the encryption processing, which is unique to the minidisk 2, with using the copyright protection information SA and SB.

Figure 7:
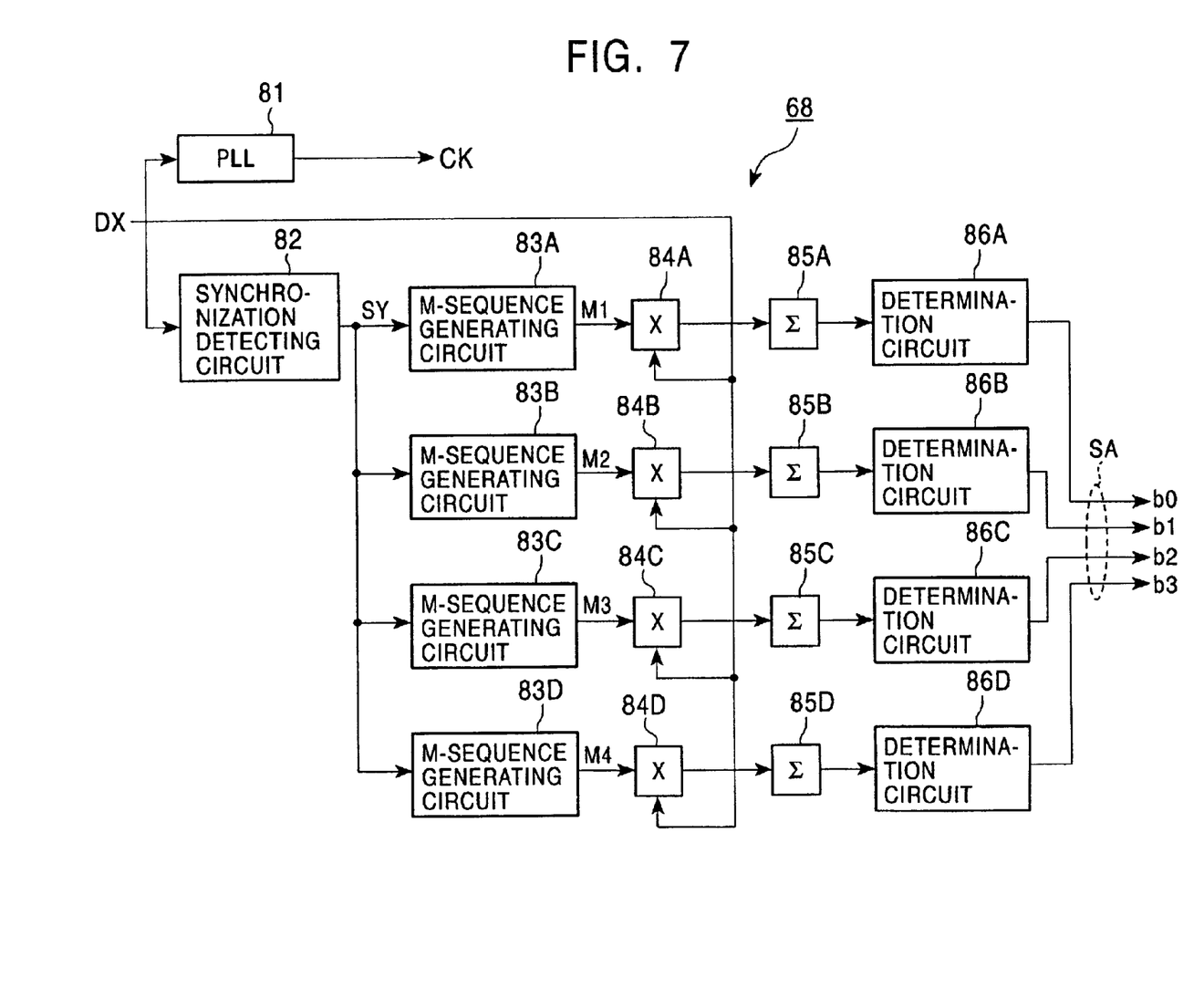
FIG. 7 is a block diagram of a second decoding circuit in the optical disk apparatus shown in FIG. 6.

FIG. 7 is a block diagram of the second decoding circuit 68 for decoding the copyright protection information SA from the digital playback signal DX. In the second decoding circuit 68, a PLL circuit 81 plays back the channel clock CK, generated at the time of recording, with reference to the digital playback signal DX, and outputs it to each part.

A synchronization detecting circuit 82 detects the synchronization pattern by recognizing the digital playback signal DX with reference to the channel clock CK, and in accordance with the detection results, plays back the initialization pulse SY generated at the time of recording.

M-sequence generating circuits 83A to 83D, with reference to the initialization pulses SY and the channel clock CK, respectively output the M-sequences M1 to M4 generated at the time of recording.

Multiplying circuits (X) 84A to 84D respectively multiplies the M-sequence signals M1 to M4 with the digital playback signal DX, and outputs the multiplication results. The multiplying circuits (X) 84A to 84D execute the multiplication processing by inverting the polarity of the digital playback signal DX according to the logic values of the M-sequence signals M1 to M4.

When the copyright information recording region 3 is accessed, since tracking control is inhibited, it is supposed that the digital playback signal DX will be obtained by scanning a plurality of tracks in a meandering manner. Thus, the digital playback signal DX is played back in a format in which the output signal from the modulation circuit 27, stored on the plurality of tracks, is further scrambled. Meanwhile, the copyright protection information SA is generated by scrambling with the random number R the operation results of the four lines, which will be independently decoded based on the corresponding M-sequences M1 to M4, and integrating into a single line of signal at the output of the modulation circuit 27. Thus, with regard to the digital playback signal DX, the output signal OUT from the modulation circuit 27, assigned to each track, is played back in accordance with scanning on the minidisk 2 and scrambling with bar codes. That is, accurate playback is possible only by a decoding based on the corresponding M-sequences M1 to M4.

Thus, integration circuits 85A to 85D, with reference to the initialization pulse SY, respectively integrate the multiplication results output from the multiplying circuits 84A to 84D, thereby outputting integration result values in accordance with the logic values of the corresponding bits b0 to b3 of the copyright protection information SA. Determination circuits 86A to 86D, with reference to the initialization pulse SY, respectively determines the binary levels of the integration results output from the integration circuits 85A to 85D, thereby decoding each of the bits b0 to b3 of the copyright protection information SA and outputting the results.

Accordingly, in the optical disk apparatus 61, the optical pickup 63 and the matrix amp 64 constitute playback signal generating means for generating a playback signal, and the PLL circuit 81, the synchronization detecting circuit 82, and the M-sequence generating circuits 83A to 83B constitute binary sequence generating means for generating a plurality of binary sequences with reference to the synchronization pattern of the playback signal. The multiplying circuits 84A to 84D constitute a plurality of sampling means for sampling the playback signal with reference to the binary sequences respectively and outputting a plurality of sampling results, the integration circuits 85A to 85D constitute a plurality of integration means for respectively integrating the sampling results and outputting a plurality of integration results, and the determination circuits 86A to 86D constitute determination means for respectively determining the integration results and decoding the corresponding bit sequences of copyright protection information.

(2) Operation of the Embodiment

In accordance with the above construction, in the manufacturing process of the minidisk 2, shown in FIG. 2, the cutting machine 7 exposes the disk body 8 and the disk body 8 undergoes developing, so that the fine concavities and convexities, which are to be transferred to the minidisk 2, are formed. By the subsequent plating process 10, etc., the disk substrate 14 of the minidisk 2, having the fine concavities and convexities transferred thereto, is formed. Then, the recording film and the protective film are formed on the disk substrate 14, whereby the minidisk 2 is fully manufactured.

In the minidisk 2 thus manufactured, shown in FIGS. 3 and 4, with regard to the lead-in area and the user data recording region 4, the drive signal SD is generated in accordance with the output signal of the address format signal generating circuit 28, and the recording laser beam L1 is modulated by the optical modulator 24 in accordance with the drive signal SD to expose the disk body 8, which is similar as in conventional minidisks. Whereas with regard to the copyright information recording region 3 on the side of the inner circumference of the minidisk 2, the copyright protection information SA, which is information regarding copyright, is modulated in the modulation circuit 27 to generate the drive signal SD, and the recording laser beam L1 is turned on and off in accordance therewith, so that the copyright protection information SA is recorded in the form of the pit sequence in the copyright information recording region 3.

As shown in FIGS. 1 and 5, the copyright protection information SA is input to the modulation circuit 27 in four parallel bits. Four lines of M-sequences M1 to M4, having a transmission rate faster than that of the copyright protection information SA and respectively corresponding to different bits, are generated in the M-sequence generating circuits 45A to 45D. The M-sequences M1 to M4 and the corresponding bits b0 to b3 are respectively operated in the operation circuits 46A to 46D. Accordingly, the copyright protection information SA is scrambled using the M-sequences M1 to M4, each of which is a binary sequence, thereby being inhibited from detection.

Furthermore, the operation results from the operation circuits 46A to 46D are selectively output by the data selector 48 according to the random number R, thereby being further scrambled to generate a single line of drive signal. Accordingly, the copyright protection information SA is further inhibited from detection.

With regard to the copyright protection information SA, the data selector 49 inserts the synchronization pattern DY in the output signal from the data selector 48, so that the M-sequences M1 to M4 can be generated with reference to the synchronization pattern DY at the time of playback, and each of the bits b0 to b3 can be played back by a decoding operation based on the generated M-sequences M1 to M4.

More specifically, in the M-sequences M1 to M4, there is no correlation, and logic 1 and logic 0 appear with the same probability; thus, if the signals which have been scrambled using the M-sequences M1 to M4 are decoded using non-corresponding M-sequences, the results of the decoding, when viewed on a long term basis, converge to the average value of signal levels corresponding to logic 1 and logic 0. Whereas if the corresponding M-sequences M1 to M4 are used for decoding, logic levels can be determined correctly.

Accordingly, in this embodiment, the bit sequences of information regarding copyright are respectively scrambled using different binary sequences to generate plural lines of signals, and the plural lines of signals are further scrambled to generate a single line of drive signal, with which laser beam is modulated, so that the copyright protection information SA is recorded in the form of an irregular pit sequence, thereby inhibiting detection of the copyright protection information.

In addition, by scrambling the four lines of signals and integrating into a single line of signal as described above, each bit of the copyright protection information is recorded while being distributed over a relatively long distance on each track.

When the copyright protection information SA is recorded in this manner, at least in the copyright information recording region 3, shown in FIG. 3, the copyright protection information SA is recorded so that the synchronization pattern is recorded in substantially the same positions in the circumferential direction, and by repeating binary sequences with reference to the synchronization pattern, the copyright protection information SA is repeatedly recorded. Thus, irrespective of the track being scanned, each byte of the copyright protection information SA is recorded while being distributed over the full length of each track of the minidisk 2.

Thus, in the minidisk 2, even if a playback is performed without any tracking control, the playback laser beam being scanned diagonally crossing a plurality of tracks, continuous playback signal is played back sequentially in time as playback signals of each of the bytes of the copyright protection information SA.

In the cutting machine 7, of the signals for scrambling, which are used for recording of the copyright protection information SA, the M-sequence signals M1 to M4 are reset in synchronization with the rotation of the disk body 8, whereas there is no reset for the random number R is generated without any reset. Accordingly, in the minidisk 2, even if the same copyright protection information SA is recorded on multiple tracks, the pit sequences corresponding to the copyright protection information SA differ on a track by track basis. Accordingly, the copyright protection information SA is further inhibited from detection.

Furthermore, when the same copyright protection information SA is recorded on multiple tracks, even if the playback laser beam is scanned diagonally crossing a plurality of tracks, the continuous playback signal is sequentially played back as the playback signal of each byte of the copyright protection information SA, and logic levels are correctly determined if decoding is performed using the corresponding M-sequences M1 to M4 independently of each other. Accordingly, even if the copyright protection information SA is recorded in the form of pit sequences which differ on a track by track basis, with tracking control inhibited, the copyright protection information SA can be played back accurately.

Furthermore, even if the copyright protection information SB is recorded in the form of bar codes overlapping the recording of the copyright protection information SA, causing temporary interrupts in the playback signal of the copyright protection information SA, the copyright protection information SA can be played back accurately.

In the optical disk manufacturing process 1, shown in FIG. 2, after the recording film is formed on the disk substrate 14, on which the fine concavities and convexities in accordance with the copyright protection information SA are formed, the region in which the copyright protection information SA is recorded is irradiated by the recording laser beam modulated in accordance with the copyright protection information SB, thereby recording the copyright protection information SB in the form of bar codes overlapping the recording of the copyright protection information SA.

Accordingly, in the minidisk 2, the copyright protection information SA is also inhibited from detection by the recording of the copyright protection information SB. In addition, by recording the copyright protection information SB in the form of bar codes, tracking control is inhibited. Thus, even if the copyright information recording region 3 is accessed for the purpose of analyzing the copyright protection information SA, the playback signal corresponding to the pit sequence cannot be properly obtained. Accordingly, the copyright protection information SA is further inhibited from detection and analysis.

Accordingly, the minidisk 2 prohibits illegal copying owing to the encryption processing using the two sets of copyright protection information SA and SB which are recorded in the above-described manner.

More specifically, with regard to the minidisk 2, referring to FIG. 6, in the optical disk apparatus 61, with tracking control inhibited, the signal in accordance with the returning light obtained by the optical pickup 63 is processed by the matrix amp 64 so as to detect the playback signal HF whose signal level changes in accordance with the bar codes, the playback signal HF is converted into the digital playback signal DX at a high sampling rate, and the digital playback signal DX is processed in the second decoding circuit 68, so that the copyright protection information SA recorded in the form of a pit sequence is played back.

Thus, in the minidisk 2, input data is recorded while being encrypted using the copyright protection information SA and SB, and playback data is decrypted based on the copyright protection information SA and SB. If, for example, the copyright protection information SA and SB are inhibited from accurate playback, the encrypted data is inhibited from accurate recording and playback. Thus, the optical disk apparatus 61 is allowed to accurately record and play back desired data only for minidisks on which the copyright protection information SA and SB are accurately recorded. Accordingly, in accordance with this embodiment, the market value of minidisks of so-called pirate editions is significantly depreciated, thereby eliminating the minidisks of pirate editions from the market.

Thus, because the copyright protection information SA and SB are inhibited from detection as described above, and in particular, the copyright protection information SA is inhibited from tracking control. Accordingly, the copyright protection information SA and SB themselves are also inhibited from copying and analysis; thus, pirate editions on which the copyright protection information SA and SB are also copied can also be eliminated effectively.

Thus, in the second decoding circuit 68, the M-sequences M1 to M4 which are identical to those at the time of recording are generated in the M-sequence generating circuits 83A to 83D with reference to the synchronization pattern, and the digital playback signal DX is multiplied therewith respectively so as to be sampled using the binary sequences which are identical to those at the time of recording. The sampling results are respectively integrated in the integration circuits 85A to 85B. Accordingly, with regard to the digital playback signal DX, the integration results which are thus obtained correspond to the logic value of the respective bits b0 to b3 of the copyright protection information SA, being independent from each other. Thus, the logic values of the respective bits b0 to b3 are decoded by determining the integration results.

Accordingly, in the optical disk apparatus 61, even if the bar codes are recorded overlapping the region where the copyright protection information SA is recorded, and further, if the patterns which differ on a track by track basis, and in addition, if plural lines of signals are scrambled to generate a single line of drive signal, so that the copyright protection information SA is inhibited from detection and copying, the copyright protection information SA can be played back accurately.

(3) Advantages of the Embodiment

In accordance with the above construction, bit sequences of information regarding copyright are respectively scrambled using different binary sequences having a transmission rate which is faster than that of the information regarding copyright, thereby generating plural lines of signals. The plural lines of signals are further scrambled to generate a single line of drive signal, with which laser beams are modulated. Accordingly, the information regarding copyright is recorded so as to inhibit detection; thus, the benefits of the copyright holder can be protected more effectively compared with before.

Furthermore, by inserting a synchronization pattern in the drive signal at a predetermined cycle, at the time of playback, the binary sequences are generated with reference to the synchronization pattern, allowing the information regarding copyright which has thus been recorded to be accurately played back.

Furthermore, by repeatedly outputting the binary sequences with reference to the synchronization pattern, even if tracking control is inhibited, for example, by bar codes overlapping the region where the information regarding copyright is recorded, the information regarding copyright can be accurately played back.

Furthermore, by generating a single line of drive signal by scrambling the plural lines of signals using a random number so that the information regarding copyright is recorded so as to allow playback even if tracking control is inhibited, the information regarding copyright can be recorded in patterns which differ on a track by track basis. Accordingly, the information regarding copyright is recorded so as to inhibit detection and copying; thus, the benefits of the copyright holder can be protected more effectively compared with before.

Furthermore, when the information regarding copyright which has thus been recorded is played back, binary sequences corresponding to the ones at the time of recording are generated and operated with a playback signal, and the operation results are integrated. Accordingly, the information regarding copyright, which has been recorded so as to inhibit detection and copying, is accurately played back.

(4) Other Embodiments

Although the above-described embodiment deals with a case where the copyright protection information is recorded in four parallel bits, the present invention is not limited thereto, and may be widely applied to cases where the copyright protection information is recorded in various numbers of bits.

Furthermore, although the above-described embodiment deals with a case where the copyright protection information SB is recorded in the form of bar codes overlapping the region where the copyright protection information SA is recorded, the present invention is not limited thereto. For example, the recording of the copyright protection information SB in the form of bar codes may be omitted. Furthermore, the copyright protection information SA may be recorded without repetition by using error correction codes, etc., thereby reducing the area of the copyright information recording region 3. Even if the recording of the copyright protection information SB in the form of bar codes is omitted, tracking control may be inhibited, for example, by intentionally creating defects.

Furthermore, although the above-described embodiment deals with a case where the copyright protection information SA is recorded in the form of a pit sequence, the present invention is not limited thereto, and may be applied to a case where the copyright protection information SA is recorded, for example, in the form of a mark sequence.

Furthermore, although the above-described embodiment deals with a case where laser beams are modulated directly by the drive signal generated in the modulation circuit 27, the present invention is not limited thereto. For example, the output signal from the modulation circuit 27 may be further phase-modulated for modulation of the laser beams. This facilitates the design of a PLL circuit on the playback side.

Furthermore, although the synchronization pattern is radially disposed in the above-described embodiment, the present invention is not limited thereto, and the synchronization pattern may be disposed at random positions in the radial direction.

Furthermore, although the above-described embodiment deals with a case where plural lines of signals are scrambled using a random number to generate a single line of drive signal, the present invention is not limited thereto. If simply plural lines of signals are selectively output in accordance with a random number, the ratio between logic 0 and logic 1 in the drive signal may not be constant. In that case, the drive signal may be monitored and bits may be inserted for compensation of the DC level.

Furthermore, although the above-described embodiment deals with a case where the information regarding copyright the copyright protection information SA and SB correspondingly includes ID information which is unique to each minidisk, information relating to manufacturing factories, year and date of production, or information for controlling enabling/disabling of copying, etc., the present invention is not limited thereto, and may be widely applied to cases where various information regarding copyright is recorded, such as a case where only key information required for encryption processing is recorded.

Furthermore, although the above-described embodiment deals with a case where input data is encrypted for recording and decrypted for playback using information regarding copyright, the present invention is not limited thereto, and may also be applied to optical disks for playback only.

Furthermore, although the above-described embodiment deals with a case where input data is encrypted using information regarding copyright, the present invention is not limited thereto. For example, access to the data may be inhibited using information regarding copyright.

Furthermore, although the above-described embodiment deals with a case where the present invention is applied to a minidisk and apparatuses associated therewith, the present invention is not limited thereto, and may be widely applied to an MO which is a similar magneto-optical disk, and in addition, to various optical disks such as compact disks and digital video disks, in which data is recorded in the form of a pit sequence, optical disks of the phase-change type, and optical disk apparatuses.

What is claimed is:

1. An optical disk apparatus which records information regarding copyright on a disk-shaped storage medium by emission of a laser beam, said optical disk apparatus comprising:

a plurality of binary sequence generating means for generating binary sequences corresponding to a number of bits of said information regarding copyright, at a transmission rate which is faster than that of said information regarding copyright;

a plurality of operation means for operating said binary sequences with corresponding bits of said information regarding copyright and outputting a plurality of operation results;

selection means for outputting a drive signal by selectively outputting, according to a predetermined switching signal, said plurality of operation results; and modulation means for modulating said laser beam in accordance with said drive signal.

2. An optical disk apparatus according to claim 1, wherein said binary sequences are M-sequences.

3. An optical disk apparatus according to claim 1, wherein a synchronization pattern is inserted in said drive signal at a predetermined cycle.

4. An optical disk apparatus according to claim 3, wherein said plurality of binary sequence generating means repeatedly output said binary sequences with reference to said synchronization pattern.

5. An optical disk apparatus according to claim 1, wherein said information regarding copyright is recorded in the form of a pit sequence by the emission of said laser beam.

6. An optical disk apparatus according to claim 1, wherein said plurality of binary sequence generating means repeatedly generate same binary sequences at a cycle of rotation of said disk-shaped storage medium, at least for a predetermined region of said disk-shaped storage medium;

wherein said plurality of operation means repeatedly multiply a same information regarding copyright with said binary sequences to output said plurality of operation results, at least for said predetermined region; and wherein said selection means selectively output said plurality of operation results to form different patterns for the repetition of said binary sequences and/or the repetition of the same information regarding copyright, at least for said predetermined region.

7. An optical disk apparatus according to claim 1, wherein said switching signal is a random number signal.

8. A method of recording on an optical disk, in which information regarding copyright is recorded on a disk-shaped storage medium by emission of a laser beam, the method comprising the steps of:

generating plural lines of signals by respectively scrambling bit sequences of said information regarding copyright with different binary sequences having a transmission rate which is faster than that of said information regarding copyright;

scrambling said plural lines of signals to generate a single line of drive signal; and modulating said laser beam in accordance with said single line of drive signal.

9. An optical disk comprising:

information regarding copyright, each bit of said information regarding copyright being recorded while being distributed in a circumferential direction of an information recording surface of said optical disk;

wherein said information regarding copyright is recorded by emission of a laser beam which is modulated in accordance with a predetermined drive signal;

wherein said drive signal is a single line of signal which is generated by scrambling a plural lines of operation signals; and wherein said plural lines of signals are generated by respectively scrambling bit sequences of said information regarding copyright using different binary sequences having a transmission rate which is faster than that of said information regarding copyright.

10. An optical disk according to claim 9, wherein said binary sequences are M-sequences.

11. An optical disk according to claim 9, wherein information relating to said information regarding copyright is recorded in a form of radially extending bar codes.

12. An optical disk according to claim 11, wherein the information relating to said information regarding copyright is unique to each optical disk.

13. An optical disk according to claim 11, wherein the information relating to said information regarding copyright is recorded in a region where said information regarding copyright is recorded.

14. An optical disk apparatus, in which encryption processing is performed using information regarding copyright which is recorded on an optical disk, said optical disk apparatus comprising:

playback signal generating means for emitting a laser beam on said optical disk, receiving returning light, and generating a playback signal in accordance with the returning light;

binary sequence generating means for generating a plurality of binary sequences with reference to a synchronization pattern of said playback signal;

a plurality of sampling means for sampling said playback signal with reference respectively to said binary sequences to thereby output a plurality of sampling results;

a plurality of integration means for respectively integrating said plurality of sampling results to thereby output a plurality of integration results; and determination means for respectively determining said integration results and decoding corresponding bit sequences of said information regarding copyright.

15. An optical disk apparatus according to claim 14, wherein said binary sequences are M-sequences.

16. An optical disk apparatus according to claim 14, wherein data recorded on said optical disk is decrypted using said information regarding copyright.

17. An optical disk apparatus according to claim 14, wherein desired data is encrypted and recorded on said optical disk using said information regarding copyright.

18. An optical disk apparatus which records information regarding copyright on a disk-shaped storage medium by emission of a laser beam, said optical disk apparatus comprising:

a plurality of binary sequence generators configured to generate binary sequences corresponding to the number of bits of said information regarding copyright, at a transmission rate which is faster than that of said information regarding copyright;

a plurality of operation units configured to operate said binary sequences with corresponding bits of said information regarding copyright and outputting a plurality of operation results;

a selector configured to output a drive signal by selectively outputting, according to a predetermined switching signal, said plurality of operation results; and a modulator configured to modulate said laser beam in accordance with said drive signal.

19. An optical disk apparatus, in which encryption processing is performed using information regarding copyright which is recorded on an optical disk, said optical disk apparatus comprising:

a playback signal generator configured to emit a laser beam on said optical disk, receiving returning light, and generating a playback signal in accordance with the returning light;

a binary sequence generator configured to generate a plurality of binary sequences with reference to a synchronization pattern of said playback signal;

a plurality of samplers configured to sample said playback signal with reference respectively to said binary sequences to thereby output a plurality of sampling results;

a plurality of integration units configured to respectively integrate said plurality of sampling results to thereby output a plurality of integration results; and a determination unit configured to respectively determine said integration results and decoding corresponding bit sequences of said information regarding copyright.

* * * * *